(12) United States Patent
Ding

(10) Patent No.: US 9,279,552 B2
(45) Date of Patent: Mar. 8, 2016

(54) ELECTRONIC CANDLE

(71) Applicant: Nantong Ya Tai Candle Arts & Crafts Co., Ltd., Nantong, Jiangsu Province (CN)

(72) Inventor: Yingqi Ding, Nantong (CN)

(73) Assignee: Nantong Ya Tai Candle Arts & Crafts Co., Ltd., Nantong, Jiangsu Province (CN)

( * ) Notice: Subject to any disclaimer, the term of this patent is extended or adjusted under 35 U.S.C. 154(b) by 153 days.

(21) Appl. No.: 14/166,349

(22) Filed: Jan. 28, 2014

(65) Prior Publication Data

US 2015/0124474 A1    May 7, 2015

(30) Foreign Application Priority Data

Nov. 7, 2013   (CN) .......................... 2013 1 0544470

(51) Int. Cl.
*F21S 6/00*   (2006.01)
*G02B 6/04*   (2006.01)
*F21S 10/00*  (2006.01)
*F21S 10/04*  (2006.01)

(52) U.S. Cl.
CPC ............... *F21S 6/001* (2013.01); *F21S 10/005* (2013.01); *F21S 10/04* (2013.01); *G02B 6/04* (2013.01)

(58) Field of Classification Search
CPC ......... F21S 6/001; F21S 10/005; F21S 10/04; F21S 10/043; G02B 6/04
See application file for complete search history.

(56) References Cited

U.S. PATENT DOCUMENTS

| 6,033,209 A * | 3/2000 | Shin ...................... C11C 5/008 431/253 |
| 2010/0254155 A1* | 10/2010 | Capo ...................... F21S 6/001 362/554 |

* cited by examiner

*Primary Examiner* — Stephen F Husar
(74) *Attorney, Agent, or Firm* — Rankin, Hill & Clark LLP

(57) ABSTRACT

The present invention discloses an electronic candle, which includes a candle body, wherein a cavity is formed inside the candle body, a lamp hole is formed in the upper surface of the candle body, a light-emitting unit is installed inside the cavity and includes a base, a first through hole and a second through hole are formed in the upper surface of the base, fixed pipes are clamped in the first through hole and the second through hole, a first light-emitting body is inserted at the lower part of the fixed pipe in the first through hole, a second light-emitting body is inserted at the lower part of the fixed pipe in the second through hole. The electronic candle is reasonable in structure, safe in use and good in effect; and the candle body is also capable of generating a seven-colored effect, thus the electronic candle is very attractive.

9 Claims, 1 Drawing Sheet

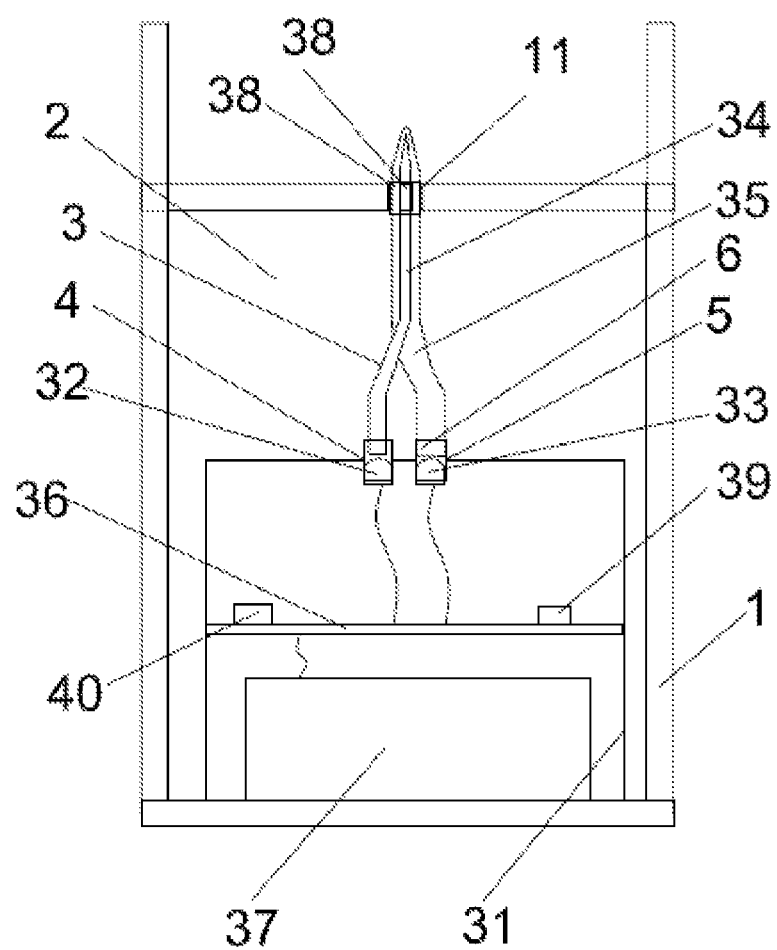

ELECTRONIC CANDLE

BACKGROUND

The present invention relates to an electronic candle with a light guiding body of simulating a candlewick. The light guiding body protrudes out of the upper surface of a candle body; the lower end of the light guiding body is at least optically connected with a light source; and the light source is positioned in a cavity in the candle body. For example, WO 2006/104898 A1 describes such one electronic candle.

Now, a candle is used as handmade furnishings but not limited to an illuminating function only. In addition, there are candles with perfumes as scented candles now. However, these candles need to be ignited for burning, are higher in relative cost, and may cause potential safety hazards. Meanwhile, these candles are single and invariable in appearance.

Recently, so-called electronic candles appear in the market; and although the electronic candles eliminate the above-mentioned potential safety hazards, the appearance of the electronic candles does not meet the demand of people, and actually-burning candles can not be visually simulated.

SUMMARY

Based on the following main tasks, the present invention provides an electronic candle, which is capable of solving the above-mentioned defects of the prior art and very visually simulating an actually-burning candle.

This task is realized through one electronic candle with the characteristics described in the claim 1.

Dependent claims are directed to a preferred embodiment of the present invention.

The present invention is based on the following basic concept: a burning flame is simulated by means of a plurality of light guiding bodies emitting light of different colors. A naturally burning flame, namely, different flame regions, respectively may have different flame colors according to flame temperatures of all flame regions. On top of this, if a light source of the light guiding body flickers through a random circuit, a natural situation of a burning candle may be provided.

The present invention is described in detail below through describing a specific embodiment in combination with only one accompanying drawing.

BRIEF DESCRIPTION OF THE DRAWINGS

An accompanying drawing schematically shows a vertical cross section of one embodiment of an electronic candle of the present invention.

DETAILED DESCRIPTION

An electronic candle disclosed by the present invention includes a candle body 1, which can be waxy, or plastic or ground glass and the like. The candle body 1 is provided with a cavity, and a light-emitting unit 3 is installed in the cavity. The upside of the candle body 1 is sealed by using a top cover, and a flame simulating body penetrates through the center of the top cover to upwards protrude. The edge of the outer part of the candle body 1 upwards protrudes and approximately exceeds the top cover so as to simulate a partially burnt candle. The downside of the candle body is also sealed by using a bottom plate, and the bottom plate should be taken down so that a battery of the electronic candle is conveniently replaced as required.

The candle body 1 is provided with a cavity 2, and the light-emitting unit 3 is installed in the cavity. The light-emitting unit includes a base 31, which is used for fixing a power supply box 37 and a circuit board 36, wherein the circuit board is provided with a timing module 40 and a music module 39. Through holes 4 and 5 are formed in the upper edge of the base 31, and fixed bases 6 are provided in the through holes. On the one hand, the fixed bases are used for fixing LED lamps 32 and 33 which are connected with the circuit board 36 and are inserted in the fixed bases 6 from the downside. On the other hand, the fixed bases are used for fixing lower ends of light guiding wires 34 and 35, and light from the LED lamps 32 and 33 enters the fixed bases. The light guiding wires 34 and 35 are designed as follows: one section of the light guiding wires 34 and 35 from the upper-half parts of the light guiding wires 34 and 35 to the flame simulating body are mutually sleeved together. That is, the first light guiding wire 34 is made into a solid rod, and is sleeved in the hollow tubular upper-half part of the second light guiding wire 35. The two light guiding wires are sharp enough to enter the flame simulating body exposed outside the top cover of the candle body 1 in an extending manner.

The light guiding wires 34 and 35 may consist of thin optical fiber bundles. In this instance, heat-shrink pipes 38 are wrapped outside optical fibers of the first light guiding wire 34 and the second light guiding wire 35, and fixed between the light guiding wires through corresponding heating.

Preferably, light sources at lower ends of the light guiding wires 34 and 35 are LED lamps, and emit light of different colors. The LED lamps can be designed as follows: the first LED lamp irradiating the first light guiding wire 34 emits white light, and the second LED lamp irradiating the second light guiding wire 35 emits yellow light. By adopting such a mode, a burning flame can be simulated, of which the outer edge emits yellow light and relatively a flame core is filled with white light. This accords with a naturally-burning flame, and the flame color distribution follows the flame temperature in each region.

In addition, the control panel 36 is also capable of modulating a current of each LED lamp so as to simulate the flame simultaneously swaying in the wind.

For a person skilled in the art, it is apparent that LED lamps of other colors can be selected for use, such as red or orange or blue.

In addition, it can be considered that the light-emitting unit 3 can be changed in structure, and other positional relations are adopted in the cavity of the candle body.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An electronic candle, comprising
   a light guiding body; wherein the light guiding body protrudes from an upper surface of a candle body until reaching outside;
   a lower end of the light guiding body is at least optically connected with a light source; the light source is positioned in a cavity of said candle body;
   wherein the light guiding body comprises at least two light guiding wires; wherein at least upper ends of the at least two light guiding wires, protruding outside the candle body, are mutually concentrically sleeved, and lower ends of the at least two light guiding wires are respectively optically connected with the light source,
wherein the at least two light guiding wires comprise an inner light guiding wire and an outer light guiding wire; wherein the inner light guiding wire is solid; wherein at least an upper-half part of the outer light guiding wire is tubular; wherein at least an upper end part of the inner light guiding wire is sleeved within the outer light guiding wire.

2. The electronic candle according to claim 1, wherein said light source emits light of different colors.

3. The electronic candle according to claim 1, wherein the upper-half part of said outer light guiding wire forms a heat shrink pipe; and the heat shrink pipe is tightened outside the upper end part of said inner light guiding wire.

4. The electronic candle according to claim 1, wherein the light source includes a first light source used in the inner light guiding wire which is a white-light LED; and a second light source used in the outer light guiding wire which is a yellow-light LED.

5. The electronic candle according to claim 1, wherein a light-emitting unit is arranged in the cavity in the candle body and comprises a base, used for fixing a power supply box and a control panel provided with a timing module and a music module; and fixed bases, embedded in through holes in an upper surface of the base and used for fixing LED lamps, which are the light source, and lower ends of the at least two light guiding wires, wherein a battery, said control panel and said LED lamps are mutually electrically connected.

6. The electronic candle according to claim 1, wherein said light guiding wires consist of optical fiber bundles.

7. The electronic candle according to claim 1, wherein the upper end of said light guiding body, protruding outside the candle body, is of a flame shape.

8. The electronic candle according to claim 6, wherein heat-shrink materials are wrapped outside optical fiber bundles of the inner light guiding wire and the outer light guiding wire.

9. The electronic candle according to claim 5, wherein the fixed bases are each provided with a cylindrical hole, and are made of elastic material.

* * * * *